(12) United States Patent
Stratton

(10) Patent No.: US 8,438,994 B2
(45) Date of Patent: May 14, 2013

(54) DISPOSABLE LITTER DEVICE AND SYSTEM

(76) Inventor: Maureen Stratton, Burbank, CA (US)

( * ) Notice: Subject to any disclaimer, the term of this patent is extended or adjusted under 35 U.S.C. 154(b) by 1252 days.

(21) Appl. No.: 11/680,543

(22) Filed: Feb. 28, 2007

(65) Prior Publication Data

US 2008/0202440 A1 Aug. 28, 2008

(51) Int. Cl.
*A01K 29/00* (2006.01)

(52) U.S. Cl.
USPC ............ 119/169; 119/170; 119/161; 119/171

(58) Field of Classification Search .......... 119/168–173, 119/161, 165, 166; D30/161
See application file for complete search history.

(56) References Cited

U.S. PATENT DOCUMENTS

| | | | | |
|---|---|---|---|---|
| 4,271,787 A * | 6/1981 | Wellman et al. | ............... | 119/168 |
| 4,627,381 A * | 12/1986 | Reed et al. | ..................... | 119/165 |
| 4,756,273 A * | 7/1988 | Yananton | ....................... | 119/169 |
| 4,800,677 A * | 1/1989 | Mack | .............................. | 119/171 |
| 4,813,374 A * | 3/1989 | Sides | .............................. | 119/170 |
| 4,869,204 A * | 9/1989 | Yananton | ....................... | 119/169 |
| 5,251,573 A * | 10/1993 | Bremley | ........................ | 119/168 |
| 5,488,930 A * | 2/1996 | Kasbo et al. | ................... | 119/170 |
| 6,244,216 B1 * | 6/2001 | Ochi | .............................. | 119/171 |
| 7,249,570 B1 * | 7/2007 | Roberson | ....................... | 119/169 |
| 2001/0042517 A1 * | 11/2001 | Ikegami et al. | ............... | 119/161 |
| 2005/0109284 A1 * | 5/2005 | Helfman | ........................ | 119/161 |
| 2005/0217594 A1 * | 10/2005 | Lange et al. | ................... | 119/170 |

\* cited by examiner

*Primary Examiner* — Andrea Valenti

(74) *Attorney, Agent, or Firm* — James A. Italia; Italia IP

(57) ABSTRACT

A disposable litter device comprising a liner layer including closure means; litter; and a litter enclosure region about a portion of the liner layer, wherein the litter enclosure region includes a closure layer and the liner layer such that the litter is retained between the closure layer and the liner layer, and wherein the enclosure region includes opening means.

11 Claims, 3 Drawing Sheets

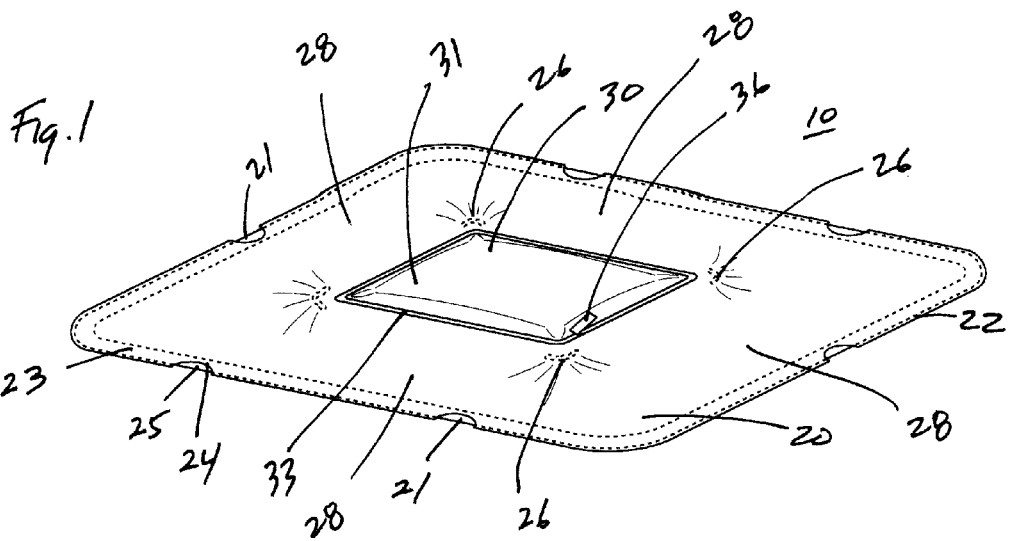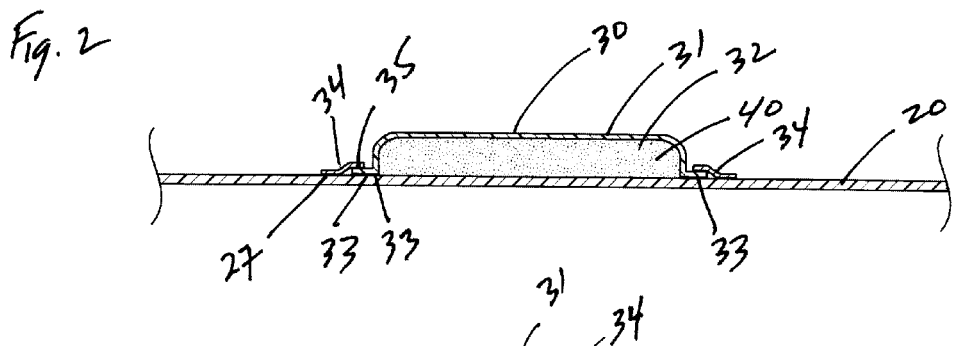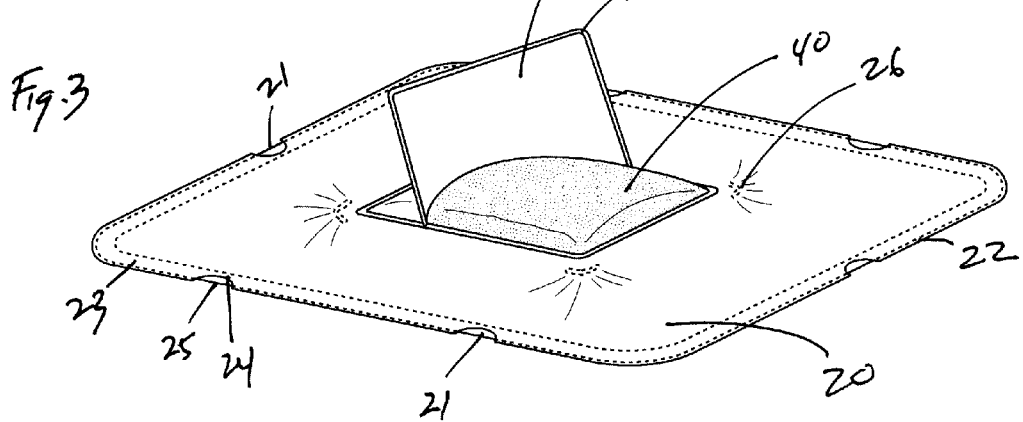

DISPOSABLE LITTER DEVICE AND SYSTEM

BACKGROUND OF INVENTION

This application relates generally to a disposable litter device and system. More specifically, this application discloses a disposable litter device and system, as used in a pet litter box, which utilizes a litter enclosure and elimination functionality to lessen some of the undesirable characteristics of dealing with pet litter.

SUMMARY

This application discloses a disposable litter device and system. The device is of simple construction and can be used in a variety of applications including in the common household pet litter box, and any other similar device where it is desirable to have a disposable litter. As used herein, "litter" means not only standard pet or cat litter, but also any absorbent material that may be used for such a purpose as is common in the art or later developed.

In particular, this application discloses a disposable litter device comprising a liner layer including closure means; litter; and a litter enclosure region about a portion of the liner layer, wherein the litter enclosure region includes a closure layer and the liner layer such that the litter is retained between the closure layer and the liner layer, and wherein the enclosure region includes opening means.

This application also discloses a disposable litter device comprising a liner layer including closure means; litter; and a litter closure layer removeably attached by opening means to a portion of the liner layer to create a litter enclosure region for retaining the litter between the closure layer and the liner layer such that when the closure layer is removed, only the liner and litter remain.

This application further discloses a disposable litter system comprising a litter box; a liner layer including a closure means such as a drawstring and litter box retaining means; litter; and a litter closure layer removeably attached by opening means to a portion of the liner layer to create a litter enclosure region for retaining the litter between the closure layer and the liner layer such that when the closure layer is removed, only the liner, litter and litter box remain.

BRIEF DESCRIPTION OF THE DRAWINGS

The drawings, when considered in connection with the following description, are presented for the purpose of facilitating an understanding of the subject matter sought to be protected.

FIG. 1 is perspective view of the disposable litter device as disclosed herein;

FIG. 2 is cross sectional view of a portion of the disposable litter device in FIG. 1;

FIG. 3 is a perspective view of the disposable litter device in FIG. 1 showing the litter closure layer partially removed;

DETAILED DESCRIPTION

Figure 4:
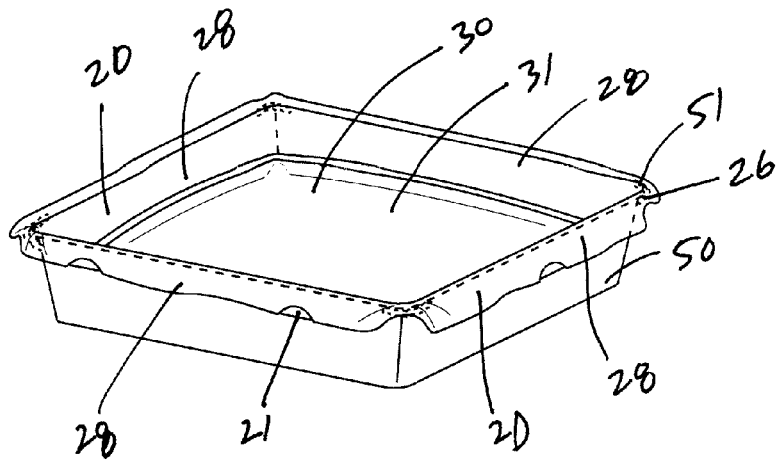
FIG. 4 is perspective view of the disposable litter device in FIG. 1 showing the device used with a litter box as part of a disposable litter system as disclosed herein.
Figure 5:
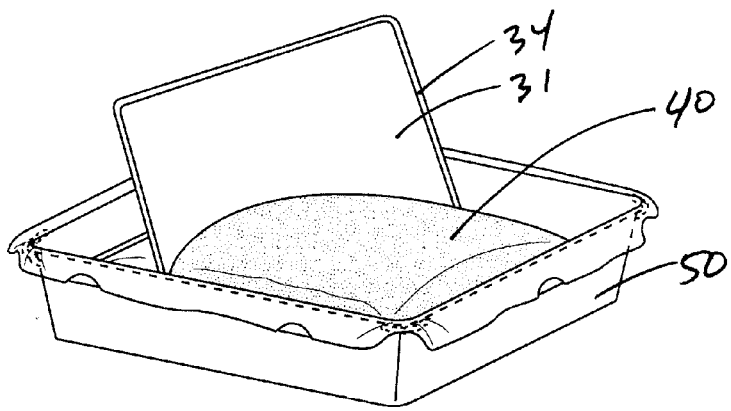
FIG. 5 is a perspective view of the disposable litter device in FIG. 4 showing the litter closure layer partially removed.
Figure 6:
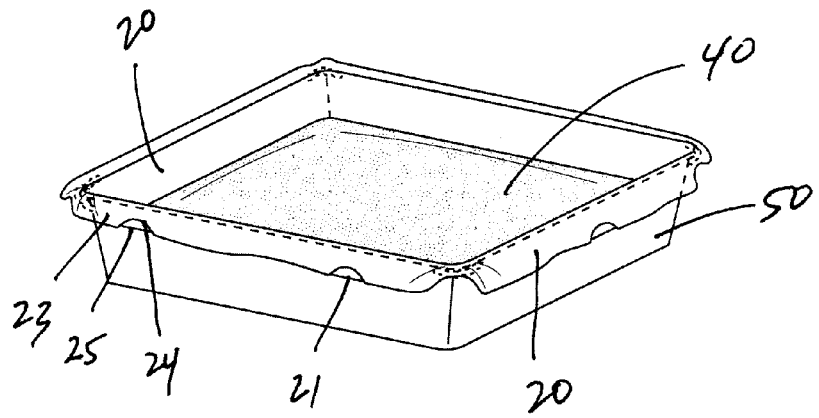
FIG. 6 is a perspective view of the disposable litter device in FIG. 4 showing the litter closure layer completely removed.

Referring to FIGS. 1-3, shown therein and generally designated by the reference character 10 is a disposable litter device constructed in accordance with the following description. The device 10 includes a liner layer 20, a litter enclosure closure region 30, and litter 40.

Figure 7:
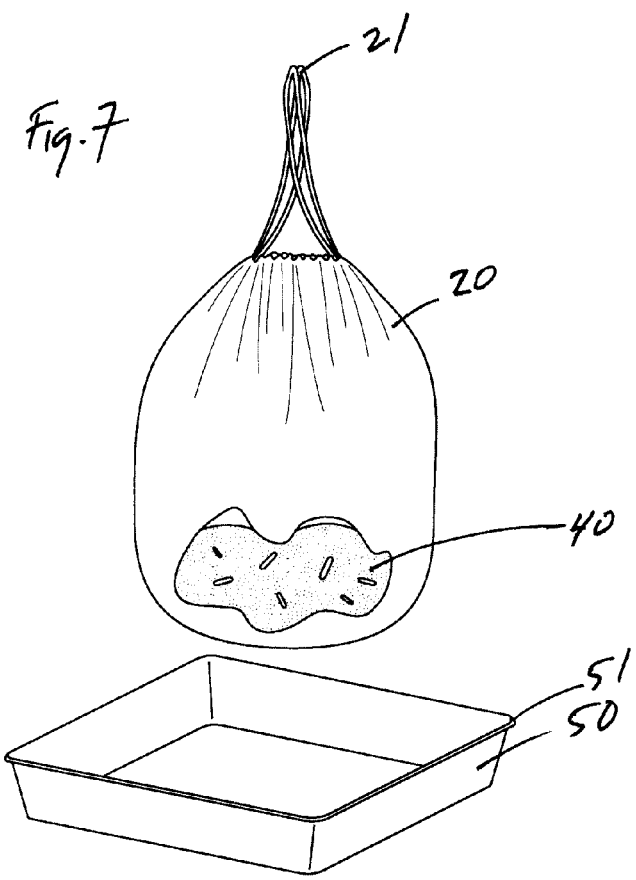
FIG. 7 is perspective view of the disposable litter device in FIG. 1 showing the device removed from the litter box and ready for disposal.

The liner layer 20 is a flexible layer that can be made from a variety of waterproof materials, including plastic or vinyl, and more preferably, polyethylene. The liner layer 20 is of sufficient thickness 1.5 to 4.0 mil, and more preferably 2.5 mil, to prevent the liner layer 20 from tearing due to a pet's scratching upon its surface. The liner layer 20 includes closure means such as a drawstring 21 as shown in FIGS. 1 and 7, but may include various other types of closure means as are common in the art, which allows the liner layer to be at least partially closed prior to disposal. The drawstring 21 is located about the periphery 22 of the liner layer 20 in a tunneled portion 23 and includes finger ways 24 for the user to grab and pull the exposed portion or portions 25 of the drawstring 21 so as to cinch the liner layer 20 at least partially closed. See FIG. 7. The liner layer 20 may also include litter box retaining means such as elasticized gussets 26, but may include various other types of retaining means such as hook and loop assemblies, Velcro™, adhesive, or any other means that would allow the device 10 and more particularly, the liner layer 20, to remain attached to a litter box 50 during use. In this embodiment, elasticized gussets 26 are shown adapted into a portion of the liner layer 20 so as to engage or fit the corner sections 51 of the litter box 50. See FIG. 4.

The liner layer 20 also forms a portion of the litter enclosure region 30. The litter enclosure region 30 includes a closure layer 31 that is removeably attached to a portion of the linear layer 20 so as to form a pocket 32 for retaining the litter 40. See FIG. 2. The closure layer 31 can be made of the same material as the liner layer, however, because it is not required to be waterproof or sufficiently tear resistant as the liner layer 20, it does not have to be as thick and it can be made of additional materials such as paper and the like. The closure layer provides a seal 33 with the liner layer 20 so that the litter 40 is retained in the pocket 32. The seal 33 can be made by directly binding the closure layer 31 to the liner layer 20 in a number of ways including heat sealing, sewing, adhesive, or any other method of sealing that is common in the art or to be developed. Alternatively, in the example shown in FIG. 2, a bondable ring 34 is applied with an adhesive to bond a portion 35 of the closure layer 31 and a portion 27 of the liner layer 20 so as to create a seal 33. Further, as shown in FIG. 1, a pull tab 36 is attached to the bondable ring 33 so as to facilitate the removal of the bondable ring 33 and the closure layer 31 so as to expose the litter 40. In addition to the pull tab 36 opening means, other methods are contemplated as part of this disclosure and would work whether the closure layer 31 is removeably bound directly to liner layer 20 or through use of a bondable ring 33 and include, a rip chord, perforated edged, and an adhesive or any other method of opening an enclosed region that is common in the art or to be developed.

Figure 8:
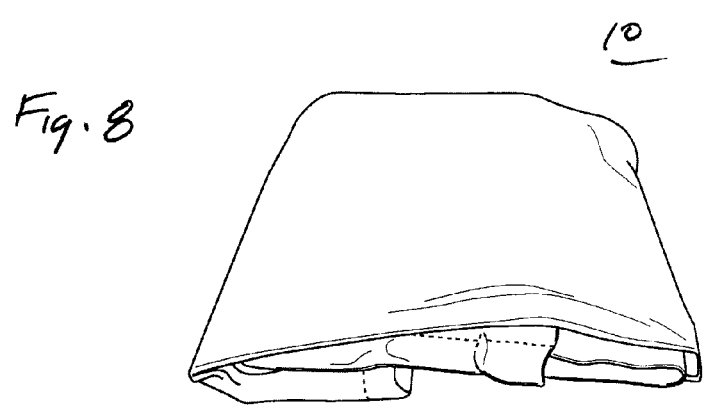
FIG. 8 is perspective view of the disposable litter device in FIG. 1 showing the device folded prior to use.

Operation of the disposable litter device 10 is shown by way of example in FIGS. 4-8. In FIG. 8, the device 10 is shown in a folded state, for example at the point of purchase or during storage, whereby the sides 28 of the liner layer 20 are folded upon each other toward the litter enclosure region 30. See FIG. 1. The device 10 can be placed in a litter box 50 whether it is in its folded or unfolded state. If the device is folded, the sides 28 are unfolded thereby exposing the closure layer 31 of the litter enclosure region 30. See FIG. 4. The liner layer 20 is then partially secured to the litter box with the litter box retaining means, if present, as described above. FIG. 4 shows an example of how the elasticized gussets 26, which are adapted into a portion of the liner layer 20, engage or fit the corner sections 51 of the litter box 50. Once the device 10 is in place in the litter box 50, the closure layer 31 is removed using the opening means described above exposing the litter 40. See FIG. 5. When the closure layer 31 is completely removed, the litter box is ready for use with the litter 40 and the liner layer 20 in place. See FIG. 6. Finally, when the litter 40 is sufficiently soiled and ready for replacement, the user would then engage the closure means such as the drawstring 21, more particularly the exposed portion or portions 25 of the drawstring 21 located about the periphery 22 of the liner layer 20, and pull so as to cinch the liner layer 20 at least partially closed. See FIG. 7. In this cinched state, the device is ready for disposal and a new disposable litter device 10 can then be put in the litter box 50.

While the present disclosure has been described in connection with what is considered the most practical and preferred embodiment, it is understood that this disclosure is not limited to the disclosed embodiments, but is intended to cover various arrangements included within the spirit and scope of the broadest interpretation so as to encompass all such modifications and equivalent arrangements.

What is claimed is:

1. A disposable litter device comprising: a liner layer having an area and including a peripheral closure means; litter; and a litter enclosure region about a central portion of the liner layer having an area substantially less than said liner layer area, wherein the litter enclosure region includes a closure layer and the liner layer such that the litter is retained between the closure layer and the liner layer and providing a liner layer margin thereabout, wherein the enclosure region includes opening means to release said litter therefrom, and wherein the opening means is selected from the group consisting of a pull tab, rip chord, perforated edged, and adhesive.

2. The device of claim 1 wherein the closure means is a drawstring.

3. The device of claim 2 wherein the liner layer further comprises litter box retaining means.

4. The device of claim 1 wherein the liner layer further comprises litter box retaining means.

5. The device of claim 4 wherein the closure means is a drawstring.

6. A disposable litter device comprising: a liner layer having an area and including a peripheral closure means; litter; and a litter closure layer removeably attached by opening means to a portion of the liner layer to create a litter enclosure region for retaining the litter between the closure layer and the liner layer such that when the closure layer is removed, only the liner and litter remain, wherein said litter enclosure region is disposed about a central portion of said liner layer, comprises an area substantially less than said liner area, and is disposed to provide a liner layer margin thereabout, wherein the opening means is selected from the group consisting of a pull tab, rip chord, perforated edged, and adhesive.

7. The device of claim 6 wherein the closure means is a drawstring.

8. The device of claim 7 wherein the liner layer further comprises litter box retaining means.

9. The device of claim 6 wherein the liner layer further comprises litter box retaining means.

10. The device of claim 9 wherein the closure means is a drawstring.

11. A disposable litter system comprising: a litter box; a liner layer including a closure means comprising a drawstring and litter box retaining means; litter; a litter closure layer removably attached by opening means to a portion of the liner layer to create a litter enclosure region for retaining the litter between the closure layer and the liner layer such that when the closure layer is removed, only the liner, litter and litter box remain; and, wherein the opening means is selected from the group consisting of a pull tab, rip chord, perforated edged, and adhesive.

* * * * *